Figure 1:
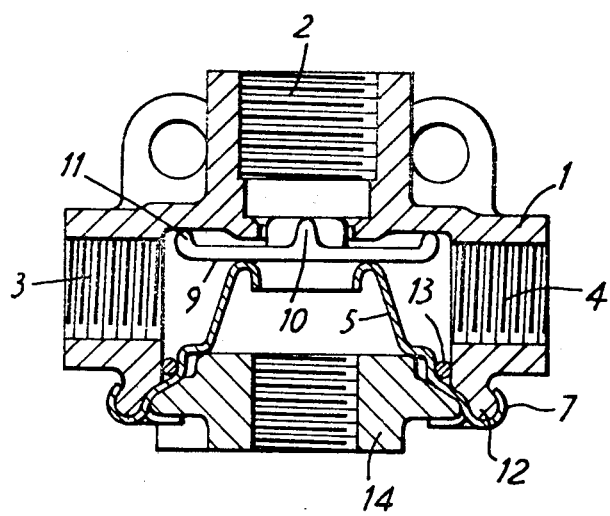

United States Patent [19]

Neal

[11] 4,453,780
[45] Jun. 12, 1984

[54] VALVE ASSEMBLIES
[75] Inventor: Brian P. Neal, Kingswood, England
[73] Assignee: Bendix Limited, Bristol, England
[21] Appl. No.: 329,787
[22] Filed: Dec. 11, 1981
[30] Foreign Application Priority Data
  Dec. 13, 1980 [GB] United Kingdom ............... 8040011
[51] Int. Cl.³ .......................................... B60T 15/52
[52] U.S. Cl. .................................. 303/69; 137/102
[58] Field of Search .............. 137/102; 303/40, 56, 303/69

[56] References Cited
U.S. PATENT DOCUMENTS
2,718,897 9/1955 Andrews ..................... 303/69 X
3,093,153 6/1963 Horowitz ..................... 303/69 X
3,424,185 1/1969 Lansky et al. ................... 137/102
4,204,555 5/1980 Durling ........................... 137/102

OTHER PUBLICATIONS
Bendix Westinghouse United Technical Pamphlet 10/008 dated May, 1976.

Primary Examiner—Duane A. Reger
Attorney, Agent, or Firm—Larry J. Palguta; K. C. Decker

[57] ABSTRACT

A quick release valve comprising a main casting (1) and a closure member (5, 27, 45) crimped on after insertion of a rubber valve member (9, 30, 48) and an 'O' ring seal (13, 39, 49).

10 Claims, 6 Drawing Figures

VALVE ASSEMBLIES

This invention relates to valve assemblies and relates especially but, not exclusively, to quick release valves for fluid pressure operated braking systems.

Quick release valves are well known for use in fluid pressure operated braking systems and one such quick release valve is described in Technical Pamphlet 10/008 dated May 1976, and published by Bendix Westinghouse Limited. Such quick release valves are installed in air brake system pressure lines connected to brake actuators to hasten the exhaust of air from the brake actuators when the applied fluid pressure is released for the purpose of releasing the brakes. In the absence of such quick release valves, fluid under pressure must travel back through relatively long lines to be exhausted at a brake control valve and because this valve is usually located some distance from the brake actuators, this can give rise to a delay in release of the brakes. When used in braking circuits which operate spring brake actuators, the use of quick release valves can improve the speed of application of the brakes. It will therefore be appreciated that in a braking system on a vehicle, it may be desirable to employ several quick release valves in the complete system. Any cost reductions which can be achieved in such quick release valves are therefore multiplied in a system and are advantageous to the cost of the complete system.

According to the present invention, there is provided a valve assembly with an input aperture, an output aperture and a vent aperture and a valve member moveable to open or close the vent aperture according to whether the pressure at the output port exceeds that at the input port or not, and wherein said body consists of two parts one of which is deformable to enable mutual gripping together thereof.

In one embodiment of the invention said one part is formed to provide the vent aperture and if desired can be arranged to house a threaded boss, a dirt excluder or silencing medium.

In another embodiment of the invention said one part can be arranged to carry the input aperture. In yet another embodiment of the invention the one part may be arranged to act merely as a closure for the other part.

Figure 2:
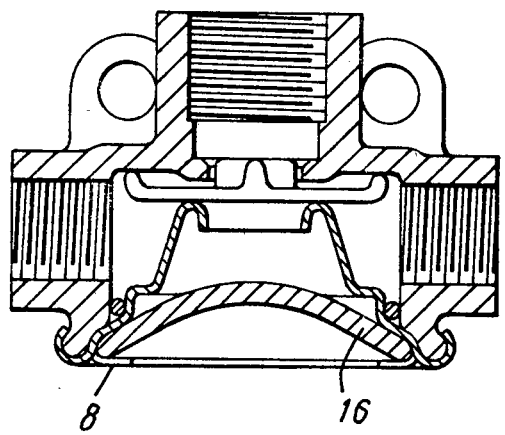
Figure 3:
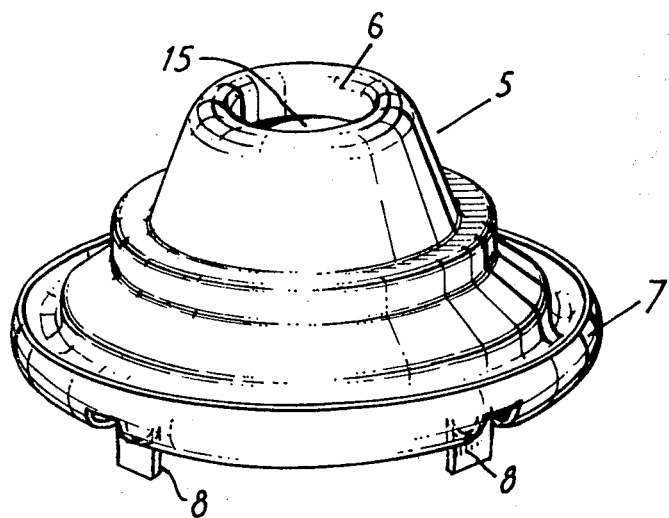

In order that the invention may be more clearly understood and readily carried into effect, the same will be further described by way of example with reference to the accompanying drawings of which:

FIG. 1 illustrates one embodiment of a valve assembly according to the invention, FIG. 2 illustrates an alternative to FIG. 1, FIG. 3 illustrates an isometric representation of a pressed steel member for use in an assembly such as described with reference to FIG. 1 and FIG. 2, and FIGS. 4, 5 and 6 illustrate alternative embodiments.

Referring to FIG. 1, the valve assembly shown therein is a quick release valve for use in fluid pressure operable braking systems and the body thereof consists of two basic parts. The first part, denoted by reference numeral 1, is a casting having a fluid pressure input aperture 2 and fluid pressure output apertures 3 and 4. The second part of the assembly consists of a steel pressing denoted by reference numeral 5, an enlarged perspective view (before mounting to the first part of the assembly) being illustrated in FIG. 3. Referring to FIG. 3, the pressing comprises a rolled-in annular inner portion 6 providing a vent aperture at 15 and a deformable outer upturned portion 7 extending at right angles to an annular region from which downwardly projecting tags 8 have been pressed out. The inner annular portion 6 of the pressed steel part is such as to form a seat for a circular stiff rubber sealing member 9 having an upwardly projecting central portion 10 which locates loosely in the input aperture of the housing. The rubber member 9 has an upwardly projecting annular lip at periphery 11 providing for positive engagement with the inside of the housing when it is lifted off the pressed steel part by resultant fluid pressure. The whole is assembled by crimping of the deformable upturned portion 7 around an annular lip 12 formed on the part 1 of the housing with an annular seal 13 being trapped therein to positively seal the region including the output apertures 3 and 4 from atmosphere when 9 is seated against 6.

The tags 8 perform no essential function in the basic construction of the device but if required they enable the retention of an exhaust boss 14 as shown in FIG. 1. Preferably this boss is provided with at least one suitable recess into which one of the tags 8 can be located to prevent rotation of 14 in the assembly when coupling to a suitable pipe connection.

Referring to FIG. 2, the exhaust boss 14 of FIG. 1 is replaced by a suitable silencer element 16 this also being retained conveniently by tags 8 being bent inwards during the assembly.

In operation of the quick release valve of FIG. 1 or 2, the outlet ports 3 and 4 are connected to respective brake actuators and the input port 2 is connected to the output of a brake control valve or relay valve. Upon the application of fluid pressure to the port 2, this acts to retain the rubber sealing member 9 against the annular rolled-in portion 6 of the pressed steel part 5 and the fluid pressure is permitted to pass around the rubber sealing member 9 to the output apertures 3 and 4, which are thus sealed from atmosphere by the member 9. Upon subsequent reduction of the pressure at the aperture 2, there is a resultant reverse pressure acting in the chamber, including apertures 3 and 4, upon the rubber sealing member 9 to cause the peripheral lip at 11 to engage the housing 1 whereby the central part of rubber sealing member 9 lifts from the rolled-in annular part 6 and permits immediate venting of fluid pressure from apertures 3 and 4 to atmosphere via the vent aperture of the member 14 of FIG. 1 or via the silencer element 16 of FIG. 2.

In the arrangements of FIGS. 1 and 2, the rubber sealing member 9, while suitably resilient to afford the necessary sealing properties against the apertures above or below it as the case may be, is made sufficiently stiff to maintain its overall general shape even when held by full reservoir pressure against either such apertures.

Figure 4:
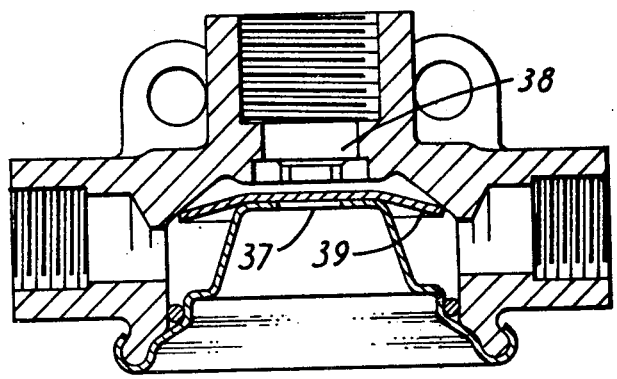

However, a more flexible sealing member may be employed quite easily if an appropriate radial grill or matrix of perforations is provided as in FIG. 4 across the respective apertures at 37 and 38 against which the flexible sealing disc 39 can rest under the action of pressure. With no pressure applied, the disc sits naturally with its periphery against the housing and its center against the vent port. It will be seen moreover that if the arrangement is such as shown for example in FIG. 5 where a silencer packing material is inserted in the vent aperture, such material may itself act to support the flexible sealing member when closing that aperture.

Figure 5:
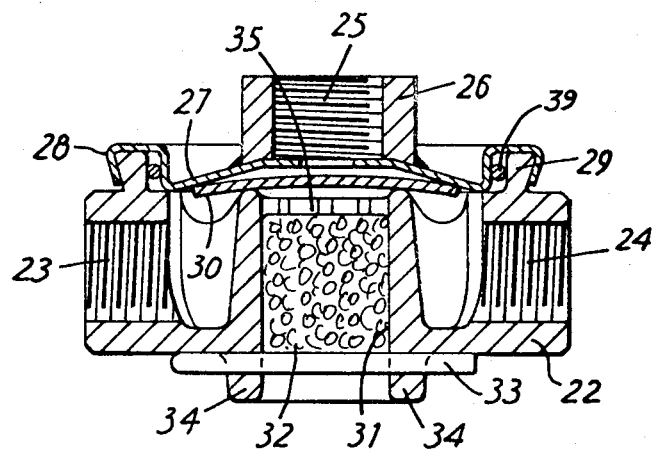

Referring to FIG. 5, the part which is provided with the output aperture is arranged as a casting having output apertures 23 and 24, input aperture 25 now being provided via an input boss 26 welded to a pressed steel member 27 having a peripheral portion 38 which is deformable to be crimped over a lip 29 provided on the casting, with seal 39 pressed therebetween. A flexible sealing member in the form of a disc 30 of rubber (like 39 of FIG. 4) is provided between the two parts, operable to seal off the vent aperture denoted by reference 31. The aperature 31 is provided in a tubular part of the casting 22 and is arranged to retain a packing plug 32 of suitable silencing material, by means of a split pin 33, passing through apertures on diametrically opposed projections 34. As the disc 30 is shown as a relatively flexible member, a radiating spoke-like web 35 is provided across the aperture 31 to provide support for disc 30 when closed to flow from input boss 26. The packing 32 of silencing material provides insufficient support for disc 30 when it is sealed across the vent aperture 31. However, it should be appreciated that the flexible disc 30 may be replaced by a more rigid rubber member such as the member 9 of FIG. 1 or FIG. 2, in which case the web 35 may be dispensed with.

Figure 6:
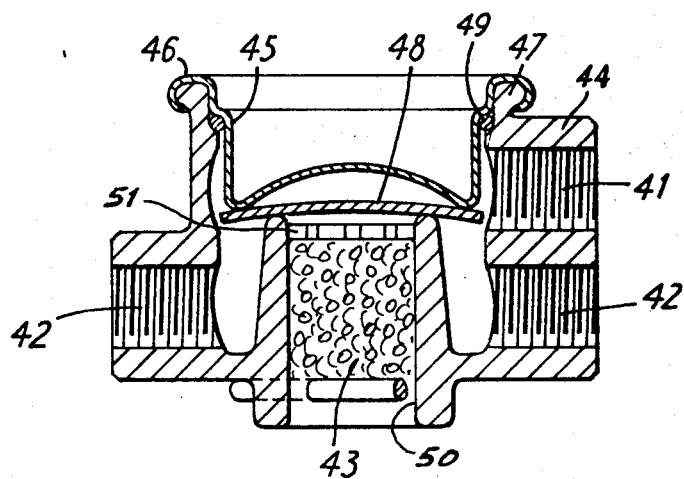

In yet another alternative quick release valve which is shown in FIG. 6, the input port 41, output port 42, and the vent aperture 43 are all formed in a main body casting 44. The casting 44 is closed by a dished pressed steel closure member 45 the periphery of which is deformable as in the other embodiments for mutal crimping onto a lip 47 of the main body. The valve member is again provided by a resilient rubber disc 48 inserted before the closure member 45 is attached, closure member 45 crimped to seal against a trapped 'O' ring 49. The pressed steel member 45 is so shaped that the dsic 48 is held against the vent aperture 50 when there is no pressure difference across it and a spoked web 51 is provided across this aperture to support the dsic 48 when air pressure is applied.

The operation of the quick release valve of FIG. 6 is substantially the same as that of FIGS. 1, 2, 4 and 5 with the exception that the input port 41 is not positively closed off by the disc 48 when the input port pressure is released. If such positive closure is required, a suitable sealing surface for it would be provided in the main body.

Although the invention has been described with reference specifically to quick release valves, the invention is not so limited in scope of its application. Other valves may be constructed by providing a pressed steel or other deformable part which by virtue of mutual gripping can make available a cheaper form of valve assembly than has hitherto been provided.

I claim:

1. An exhaust valve assembly comprising:
a housing having a cavity, input and outport ports in communication with said cavity, and a housing lip disposed about said cavity, a cover engaging said housing to cover the cavity and having a portion extending axially to said cavity and a perimeter flange, the portion having an opening providing an exhaust opening for said assembly, a flexible sealing member positioned relative to said input port by the portion of said cover, the perimeter flange of the cover formed over said housing lip to secure the cover to the housing and enable the portion to maintain the position of the sealing member relative to said input port, whereby said sealing member is operative in response to fluid pressure at said input port to close said exhaust opening and provide communication between said input and output ports, and the sealing member also being responsive to greater fluid pressure at said output port than at said input port to provide communication between said output port and exhaust opening.

2. The exhaust valve assembly in accordance with claim 1, further comprising tags extending from said cover and a boss, the boss supported by said tags.

3. The exhaust valve assembly in accordance with claim 1, wherein said cover includes a boss having a threaded opening for threadedly receiving a connection thereto.

4. The exhaust valve assembly in accordance with any one of claims 1-3, wherein said sealing member normally encloses the input port and is urged into sealing engagement over said exhaust opening by inward flow of fluid through the input port.

5. The exhaust valve assembly in accordance with any one of claims 1-3, wherein said perimeter flange is annular and is formed over a correspondingly shaped housing lip.

6. A valve assembly comprising:
a housing having an open end, an interior cavity in communication with the open end, a housing lip disposed about said opening, and a plurality of ports in communication with said cavity, a flexible sealing member positioned in said cavity and movable between opposite positions to selectively provide flow between selected ones of said ports, sealing means for effecting a fluid-tight seal and disposed at the open end, and a cover over the open end of said housing to cover said open end, said cover comprising a perimeter flange and an inward projection having means for positioning said sealing member relative to said ports, the perimeter flange formed over the housing lip to secure the cover thereto and provide in cooperation with said sealing means a fluid-tight enclosure between the flange and housing lip.

7. The valve assembly in accordance with claim 6, wherein said cover includes an aperture providing an opening for the inflow of fluid.

8. The valve assembly in accordance with claim 6, wherein said ports are all disposed within an integral housing.

9. The valve assembly in accordance with claim 7, further comprising an inlet port boss attached to said cover and coaxial therewith, whereby fluid may enter through said inlet port boss and aperture for flow to another port.

10. The valve assembly in accordance with claim 6, wherein said cover comprises an annular member with said inward projection providing positioning support for said sealing member disposed in said cavity.

* * * * *